United States Patent [19]

Stephenson

[11] Patent Number: 5,757,388
[45] Date of Patent: May 26, 1998

[54] ELECTRONIC CAMERA AND INTEGRAL INK JET PRINTER

[75] Inventor: Stanley W. Stephenson, Rochester, N.Y.

[73] Assignee: Eastman Kodak Company, Rochester, N.Y.

[21] Appl. No.: 767,394

[22] Filed: Dec. 16, 1996

[51] Int. Cl.[6] .......................... G03B 17/48; G03B 29/00
[52] U.S. Cl. ..................... 347/2; 396/374; 396/429; 358/502; 358/527; 358/906; 358/909.1
[58] Field of Search .......................... 396/30, 374, 429, 396/430; 358/296, 302, 401, 501, 906, 909.1, 502, 527; 347/1, 2, 108; 348/207, 373, 552, 839

[56] References Cited

U.S. PATENT DOCUMENTS

| | | | |
|---|---|---|---|
| 4,161,749 | 7/1979 | Erlichman | 358/501 |
| 4,262,301 | 4/1981 | Erlichman | 358/906 |
| 4,937,676 | 6/1990 | Finelli et al. | 358/229 |
| 5,032,911 | 7/1991 | Takimoto | 358/76 |
| 5,121,343 | 6/1992 | Faris | 347/5 |
| 5,164,751 | 11/1992 | Weyer | 396/430 |
| 5,189,522 | 2/1993 | Stephenson, III | 358/296 |
| 5,493,409 | 2/1996 | Maeda et al. | 396/429 |

*Primary Examiner*—A. A. Mathews
*Attorney, Agent, or Firm*—Raymond L. Owens

[57] ABSTRACT

Apparatus for capturing and printing images on a receiver sheet includes a camera for electronically storing an image of a subject and having a display for displaying such stored image and including alignment structure and an ink jet printer, an ink jet print head including a plurality of colored inks and a structure for providing relative movement between the ink jet print head and the receiver sheet. The ink jet print head further includes coupling the ink jet printer to the alignment structure to provide a unitary camera printer unit. Image signals are transferred to the ink jet print head to cause the ink jet print head to deliver ink to a receiver sheet to form an image corresponding to the stored image on the receiver sheet.

3 Claims, 2 Drawing Sheets

5,757,388

ELECTRONIC CAMERA AND INTEGRAL INK JET PRINTER

CROSS REFERENCE TO RELATED APPLICATION

The present invention is related to U.S. patent application Ser. No. 08/767,573, filed simultaneously herewith, entitled "Electronic Camera and Associated Printer Which Uses a Display Image", assigned to the assignee of the present invention. The disclosure of these related applications is incorporated herein by reference.

1. Field of the Invention

The present invention relates to electronic cameras and to the printing of images produced by such camera.

2. Background of the Invention

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card.

A shortcoming with prior electronic cameras is that the printer is spaced from the camera and must be electrically coupled to digital storage structure within the camera which frequently produces artifacts. Printers often use a structure which provide relative movement of a head and a media sheet which induces artifacts into the output hard copy print and is therefore difficult to provide an effective structure mounted on a camera body.

U.S. Pat. No. 4,937,676 issued Jun. 26, 1990 to Finelli et al shows an electronic imaging camera and a hard copy printer which can be interconnected for use either in combination or apart. The printer uses instant photographic film which, of course, has its own disadvantages, generally being high in speed and relatively high cost per print.

SUMMARY OF THE INVENTION

It is an object of the present invention to provide a combination of an electronic camera and a printer which can effectively provide a hard copy and minimize the above problems.

This object is achieved by apparatus for capturing and printing images on a receiver sheet comprising:

a) a camera for electronically storing an image of a subject and having a display for displaying such stored image and including alignment means;

b) an ink jet printer including means for receiving the receiver sheet, an ink jet print head including a plurality of colored inks and means for providing relative movement between the print head and the receiver sheet, such printer further including:

i) means for coupling the ink jet printer to the alignment means to provide a unitary camera printer unit; and ii) means for transferring image signals to the print head to cause the print head to deliver ink to a receiver sheet to form an image corresponding to the stored image on the receiver sheet.

Advantages

It is an advantage of the present invention that an ink jet printer can be integrally coupled to an electronic camera improving the electronic interconnection between the camera and the printer and providing high quality, low cost prints. Moreover, by coupling the ink jet printer and the camera, a portable assembly is provided.

DETAILED DESCRIPTION OF THE INVENTION

The invention is directed to a compact ink jet printer used in conjunction with electronic cameras. Such cameras often have a flat panel color display that is used to frame and/or review capture images. Separable printers exist that receive data from said electronic capture devices. Typically, interface electronics is disposed in each device and data is transmitted from the electronic camera to the printer.

Figure 1:
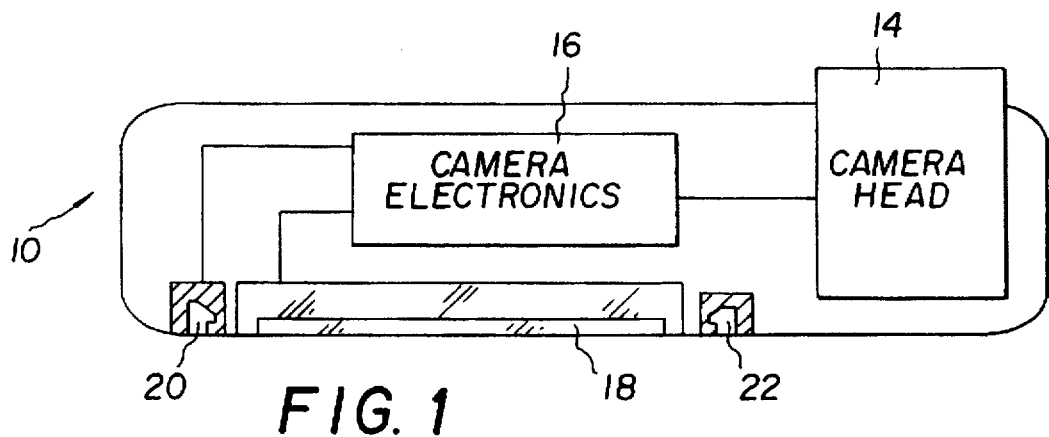
FIG. 1 is a top section view of an electronic camera which is adapted to be coupled to an ink jet printer in accordance with the present invention.
Figure 2:
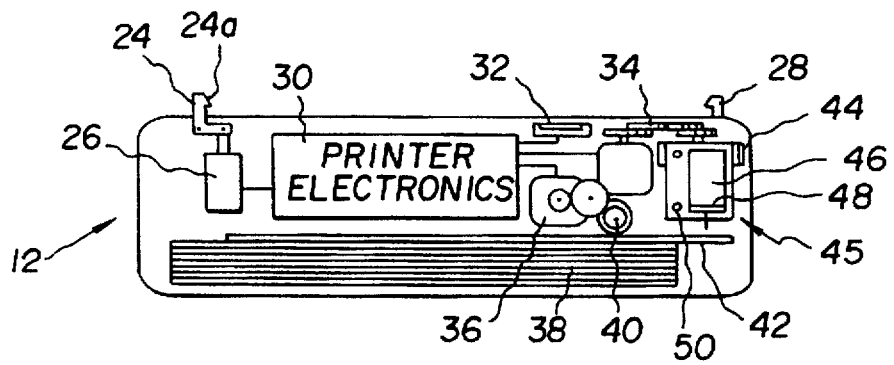
FIG. 2 is a top section view of the ink jet printer which is adapted to be coupled to the electronic camera of FIG. 1.

Turning now to FIGS. 1, an electronic camera 10 is shown and in FIG. 2 an ink jet printer 12 is shown. Electronic camera 10 is of conventional design and can capture either still or motion images. Images are captured by camera head 14 which typically includes an optical system and an image sensor. Electronic signals from the camera head 14 are transferred to camera electronics 16. Camera electronics 16 includes a storage memory for storing digital images captured by the image sensor. These stored images are used to drive the camera display 18 in a well known manner. Camera display 18 can be for instance a LCD or organic polymer display system of conventional design.

Electronic camera 10, in accordance with the present invention, includes the additional modification of an active socket 20 and a passive socket 22 for the purpose of connecting the ink jet printer 12 over camera display 18 to form a unitary camera printer unit. By unitary camera printer unit is meant that the two units can be coupled to provide a portable assembly. Moreover, the printer can make copies when it is directly coupled to the camera. Active socket 20 incorporates electronic sensing circuitry to communicate with ink jet printer 12.

Electronic sensing circuitry can be a wire active socket 20 to communicate with ink jet printer 12. Alternatively, a light sensing/transmitting assembly can be incorporated in or near the active socket 20.

Figure 3:
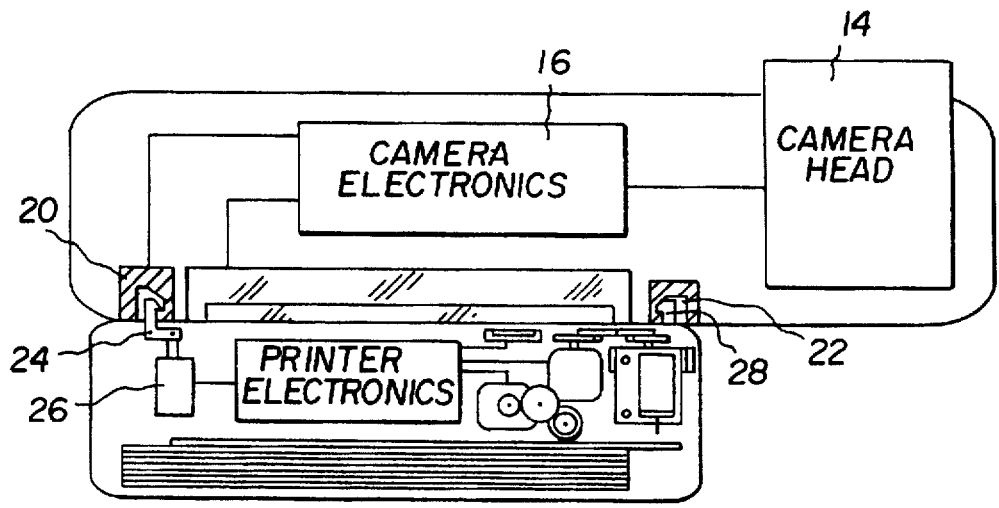
FIG. 3 shows the ink jet printer of FIG. 2 attached to the camera of FIG. 1.
Figure 5:
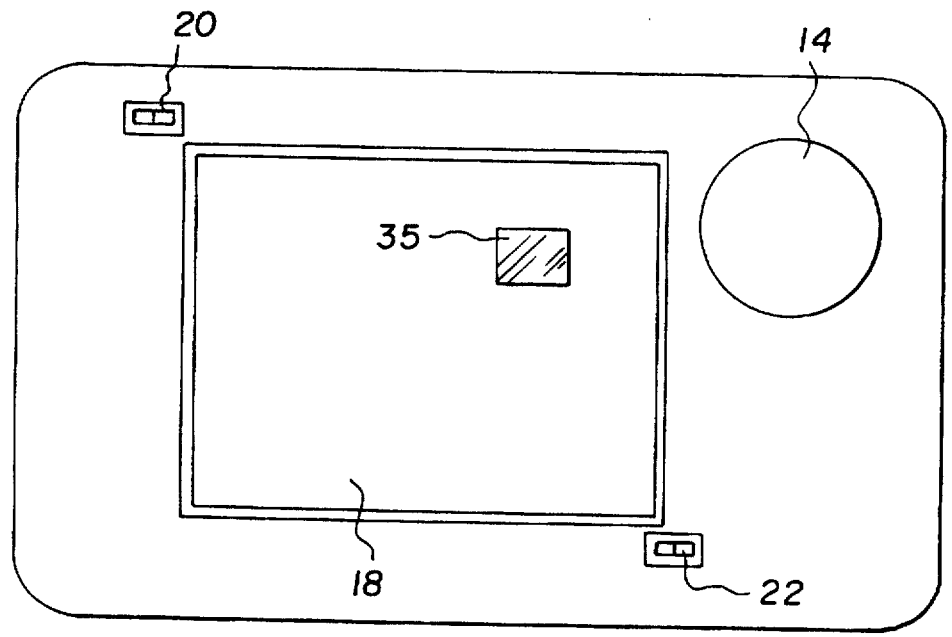
FIG. 5 is a rear view of the electronic camera shown in FIG. 1.

The ink jet printer 12 has an active latch 24 and a passive latch 28 that permits the printer to be secured over the camera display 18. In this embodiment the latches 24 and 28 are hooked and secure to matching detail 24a formed in the sockets 20 and 22 of camera 10. The rear view of the camera in FIG. 5 shows the position of the active socket 20 and the passive socket 22 and camera display 18. A latch driver 26 permits the selective securing and release of the ink jet printer 12 from camera 10 under control of printer electronics 30. FIG. 3 shows the ink jet printer 12 secured to camera 10.

Figure 4:
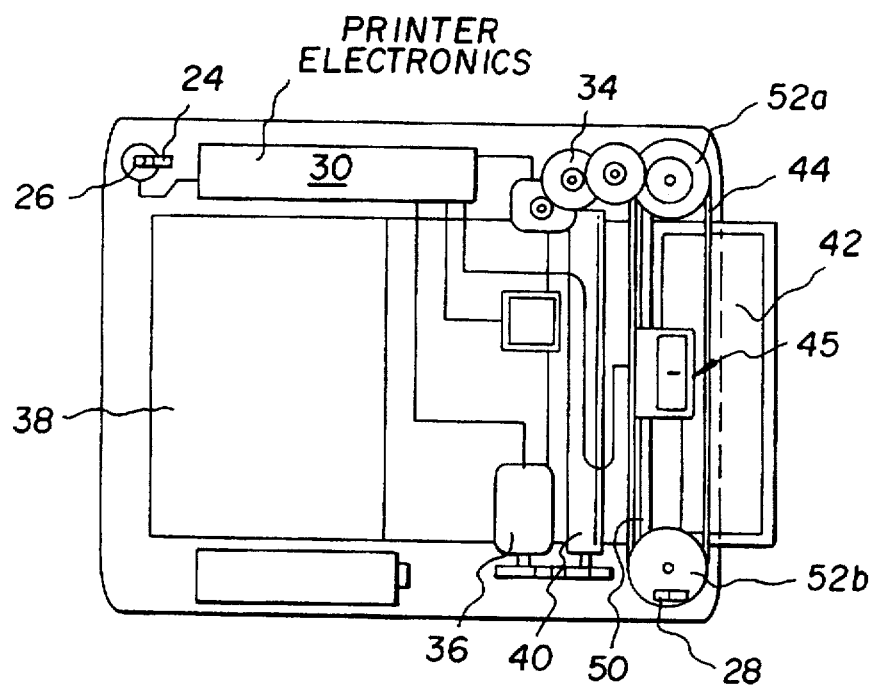
FIG. 4 is a front sectional view showing portions of the ink jet printer of FIG. 2.

The ink jet printer 12 contains a stack of media sheets 38. A roller 40, disposed over the stack, is actuated to advance a printable sheet 42 from media sheets 38 past an ink jet print head 45. The print head will be understood to include a plurality of colored inks so that it is capable of reducing esthetically pleasing colored images with relatively high resolution. In one embodiment, the ink jet print head 45 contains an ink reservoir 46 that supplies ink to an ink jet 48. FIG. 4 shows a top view of the printer. A set of pulleys 52a and 52b, secure a drive belt 44 that is attached to the ink jet print head 45. Guide rails 50 are used to guide the ink jet print head 45 transverse to the direction of motion of the printable sheet 42.

It is an important feature of the present invention that when the ink jet printer 12 is attached to the camera 10, prints can be made when it is part of the unitary camera printer unit. Alternatively, the ink jet printer 12 can be decoupled from the camera and can be used as a spaced apart accessory, typically connected by wiring to the camera 10. A colored image is formed on printable sheet 42 by advancing printable sheet 42 an incremental amount using roller 40 and roller drive 36. Head drive 34 is actuated to drive the ink jet print head 45 longitudinally across printable sheet 42. The ink jet print head 45 is selectively driven by printer electronics 30 so as to form a strip of printed image. The printer electronics 30 can conveniently receive image information from the camera electronics 16 which includes a storage unit as previously discussed. However, in accordance with the present invention, the printer electronics 30 can also be directly coupled to the camera display 18 using printer receiver device 32, discussed hereinafter. After the ink jet print head 45 has completed a section of the image, printable sheet 42 is advanced again to begin the next printing cycle. The process is continued until a complete image is formed on printable sheet 42.

Image transfer between electronic camera 10 and ink jet printer 12 is accomplished using image display 18 in conjunction with a printer receiver device 32 which is sensitive to emissions from camera display 18. Printer receiver device 32 can be a sparse array of charged couple device elements of conventional design. Alternatively, printer receiver device 32 can be one or more photosensitive semiconductor devices responsive to light emitted from camera display 18.

In operation, an operator obtains a print by interconnecting ink jet printer 12 with the camera 10. Latches 24 and 28 automatically secure ink jet printer 12 to electronic camera 10. The operator signals the start of printing using printer electronics 30. The printer's active socket 20 signals the camera electronics 16 to indicate that it is in the condition for transferring images to the ink jet printer 12 using camera display 18. Upon print initialization, electronic camera 10 selectively modulates camera display 18 so as to communicate with printer receiver device 32. The printer electronics 30 and the camera electronics 16 are designed to optimize data transmission.

The printer receiver device 32 includes of a 10 by 10 array of sensing sites. Each site covers a 10 by 10 array of pixels on the camera display. The 100 sets of 100 pixels are modulated to transmit image data in parallel. A limited number of 16 density levels can be used across the set of camera pixels to increase data transmission rates. Using this method 400 bits of data can be transmitted per camera display 18 update. Display area 35 corresponds to the area sensed by printer receiver device 32. Display area 35 and printer receiver sensor 32 are kept in close alignment by the camera sockets and the printer latches.

It is advantageous for the camera 10 and the ink jet printer 12 to indicate the change in camera display 18 from a display to a data transmission mode. This is accomplished by a sensor on the camera detecting printer presence. Timing signals transmitted through active socket 20 and active latch 24 are used to synchronize display modulation and the printer data reception. Active latch 24 is used to signal start of transmission. Transmission can be synchronized by embedding timing signals into the camera display signal.

Data transmission is done synchronous with the printing of the image per U.S. Pat. No. 5,189,522, the disclosure of this patent is incorporated by reference. Alternatively all or a large subset of the image can by transferred to memory elements in printer electronics 30 prior to the beginning of dye deposition.

The use of the latch driver 26 under the control of printer electronics 30 ensures that ink jet printer 12 is not detached from electronic camera 10 during image transmission from camera display 18 and printer receiver device 32. An operator detaches ink jet printer 12 from electronic camera 10 using an interface to printer electronics 30 such as a conventional switch. Printer electronics 30 then activates latch driver 26 to permit removal of ink jet printer 12 from camera 10.

The invention has been described in detail with particular reference to a certain preferred embodiment thereof, but it will be understood that variations and modifications can be effected within the spirit and scope of the invention.

Parts List
10 electronic camera
12 ink jet printer
14 camera head
16 camera electronics
18 camera display
20 active socket
22 passive socket
24 active latch
24a detail
26 latch driver
28 passive latch
30 printer electronics
32 printer receiver device
34 head drive
35 display area
36 roller drive
38 media sheets
40 roller
42 printable sheet
44 drive belt
45 ink jet print head
46 ink reservoir
48 ink jet
50 guide rails
52a pulley
52b pulley

We claim:

1. Apparatus for capturing and printing images on a receiver sheet comprising:
  a) a camera for electronically storing an image of a subject and having a display effective in a first condition for displaying such stored image and effective in a second condition for permitting image transfer and including alignment means;
  b) an ink jet printer including means for receiving the receiver sheet, an ink jet print head including a plurality of colored inks and means for providing relative movement between the print head and the receiver sheet, such ink jet printer further including:
    i) means for coupling the ink jet printer to the alignment means to provide a unitary camera printer unit;

iii) means for transferring image signals to the ink jet print head to cause the ink jet print head to deliver ink to a receiver sheet to form an image corresponding to the stored image on the receiver sheet; and wherein the alignment means further includes an active socket which includes electronic sensing circuitry for communicating with the ink jet printer.

2. The apparatus of claim 1 further including means for preventing the ink jet printer from being detached from the camera when there is electronic communication between the display and the ink jet print head.

3. Apparatus for capturing and printing images on a receiver sheet comprising:

(a) a camera for electronically storing an image of a subject and having a display for displaying such stored image and including alignment means;

(b) a printer including means for receiving the receiver sheet, a print head and means for providing relative movement between the print head and the receiver sheet, such printer further including:

(i) means for coupling the printer to the alignment means to provide a unitary camera printer unit;

(ii) means for providing electronic communication between the display and the print head to transfer image to the print head;

(iii) means for causing the print head to form an image of the stored image on the receiver sheet;

wherein the alignment means further includes an active socket which includes electronic sensing circuitry for communicating with the printer; and further including means for preventing the printer unit from being detached from the camera when there is electronic communication between the display and the print head.

* * * * *